United States Patent
Hagiwara et al.

(10) Patent No.: US 7,260,175 B2
(45) Date of Patent: Aug. 21, 2007

(54) CT IMAGE PRODUCING METHOD AND X-RAY CT APPARATUS

(75) Inventors: Akira Hagiwara, Tokyo (JP); Kotoko Morikawa, Tokyo (JP)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 203 days.

(21) Appl. No.: 11/074,228

(22) Filed: Apr. 8, 2005

(65) Prior Publication Data

US 2005/0201511 A1    Sep. 15, 2005

(30) Foreign Application Priority Data

Mar. 9, 2004 (JP) .............. 2004-065003

(51) Int. Cl.
*G21K 1/12* (2006.01)
(52) U.S. Cl. .................. 378/19; 378/11
(58) Field of Classification Search ........ 378/4–20, 378/11, 19, 57, 901; 382/131, 132
See application file for complete search history.

(56) References Cited

U.S. PATENT DOCUMENTS

| | | | | |
|---|---|---|---|---|
| 5,825,842 A * | 10/1998 | Taguchi | ............. | 378/15 |
| 5,991,356 A | 11/1999 | Horiuchi et al. | ............. | 378/15 |
| 6,061,421 A | 5/2000 | Hagiwara | ............. | 378/4 |
| 6,185,271 B1 * | 2/2001 | Kinsinger | ............. | 378/19 |
| 6,272,200 B1 * | 8/2001 | Pan et al. | ............. | 378/15 |
| 6,301,325 B1 | 10/2001 | Besson et al. | ............. | 378/15 |
| 6,415,012 B1 * | 7/2002 | Taguchi et al. | ............. | 378/15 |
| 6,442,228 B1 | 8/2002 | Woloschek et al. | ............. | 378/8 |
| 6,445,764 B2 | 9/2002 | Gohno et al. | ............. | 378/19 |
| 6,463,118 B2 | 10/2002 | Besson | ............. | 378/15 |
| 6,539,074 B1 | 3/2003 | Yavuz et al. | ............. | 378/4 |
| 6,650,727 B2 | 11/2003 | Kuroda | ............. | 378/19 |
| 6,744,844 B2 | 6/2004 | Horiuchi | ............. | 378/8 |
| 6,795,522 B2 | 9/2004 | Nishide et al. | ............. | 378/4 |

(Continued)

FOREIGN PATENT DOCUMENTS

JP    05-130984    5/1993

(Continued)

OTHER PUBLICATIONS

X-Ray CT Imaging Method and X-Ray CT Apparatus; U.S. Appl. No. 10/979,534, filed Nov. 2, 2004; 32 pgs.

(Continued)

*Primary Examiner*—Courtney Thomas
*Assistant Examiner*—Alexander Taningco
(74) *Attorney, Agent, or Firm*—Armstrong Teasdale LLP

(57) ABSTRACT

A method for producing a CT image by applying Z-filtering to axial scan data collected using a multi-row detector, wherein second axial scan data is collected at a second position Z2 to which an X-ray tube and a multi-row detector are rectilinearly moved relative to a subject to be imaged from a first position Z1 toward an end of the multi-row detector, projection data corresponding to a central portion a2 of a reconstruction field P3 near the end of the multi-row detector is extracted from the second axial scan data, and Z-filtering is applied based on the projection data of reconstruction fields P1, P2 and P3 to produce one CT image.

16 Claims, 16 Drawing Sheets

U.S. PATENT DOCUMENTS 6,826,251 B1 * 11/2004 Miyazaki et al. ............. 378/15
2004/0174960 A1 * 9/2004 Hsieh et al. ................ 378/210

FOREIGN PATENT DOCUMENTS

| JP | 09-154838 | 6/1997 |
|----|-----------|--------|
| JP | 2002-147061 | 5/2002 |
| JP | 2002-147231 | 5/2002 |
| JP | 2002-235561 | 8/2002 |
| JP | 2002-235562 | 8/2002 |
| JP | 2002-267833 | 9/2002 |
| JP | 2002-322756 | 11/2002 |
| JP | 2002-338947 | 11/2002 |
| JP | 2003-159244 | 6/2003 |
| JP | 2003-334188 | 11/2003 |
| JP | 2004-041674 | 2/2004 |

OTHER PUBLICATIONS

X-Ray CT Imaging Method and X-Ray CT System; U.S. Appl. No. 10/885,189, filed Jul. 6, 2004; 35 pgs.

CT Image Producing Method and X-Ray CT Apparatus; U.S. Appl. No. 10/979,628, filed Nov. 2, 2004; 25 pgs.

Multi-Positional CT Image Producing Method and X-Ray CT Apparatus; U.S. Appl. No. 11/017,014, filed Dec. 20, 2004; 25 pgs.

X-Ray CT Image Production Method and X-Ray Ct System; U.S. Appl. No. 10/979,616; filed Nov. 2, 2004; 24 pgs.

* cited by examiner

| | Channel index | | | |
| --- | --- | --- | --- | --- |
| | 1 ch | 2 ch | ... | I ch |
| Row 1 | 16 bits | 16 bits | | |
| Row 2 | 16 bits | | | |
| Detector row index ⋮ | | | | |
| | | | | |
| | | | | |
| | | | | |
| | | | | Z-coordinate information |
| Row J | | | | View information |

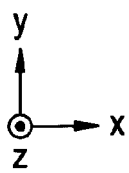
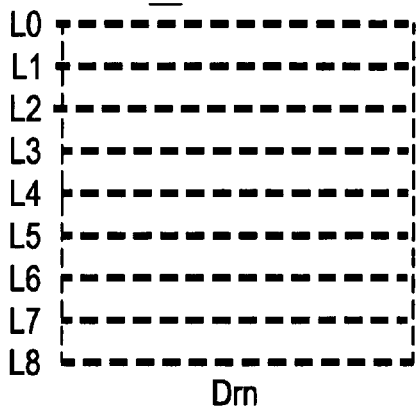
FIG. 15
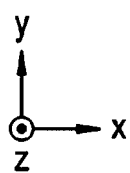
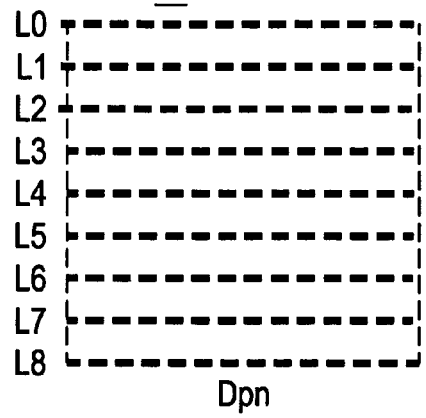
FIG. 16
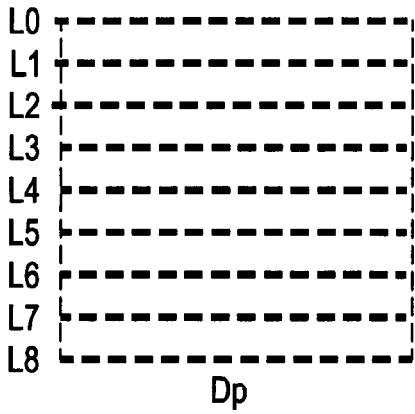
FIG. 17
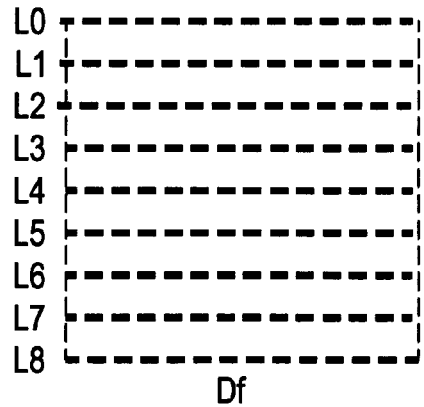
FIG. 18
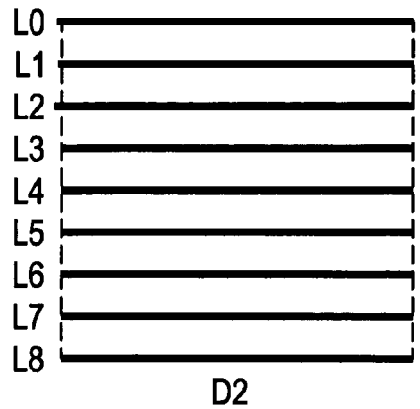
FIG. 19
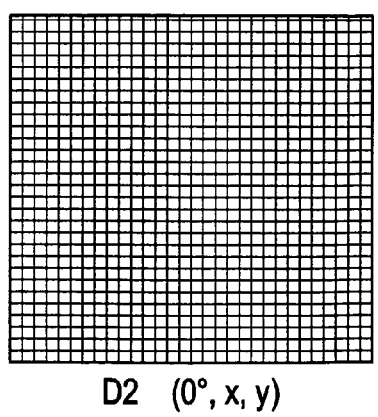
FIG. 20

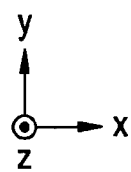
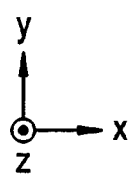
FIG. 21
FIG. 22
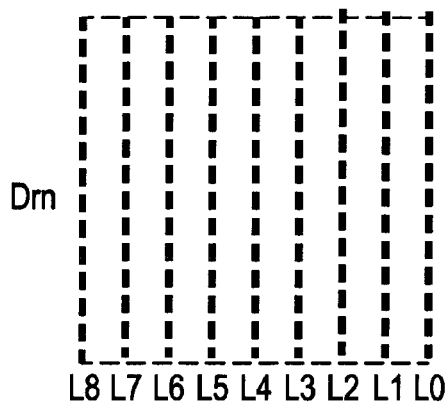
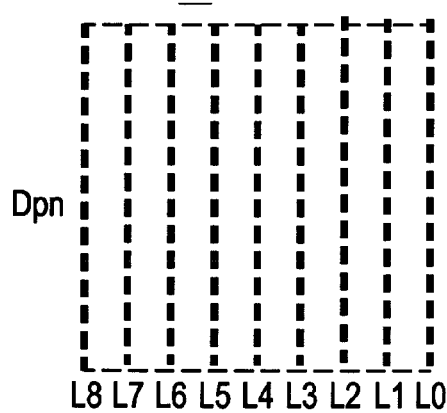
FIG. 23
FIG. 24
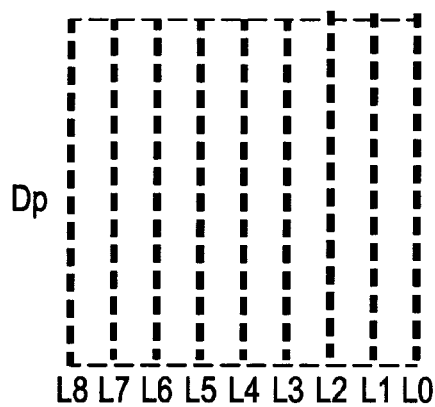
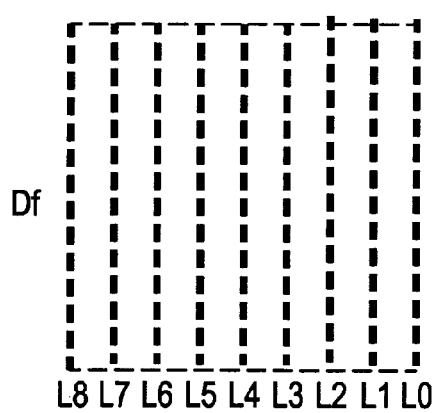
FIG. 25
FIG. 26
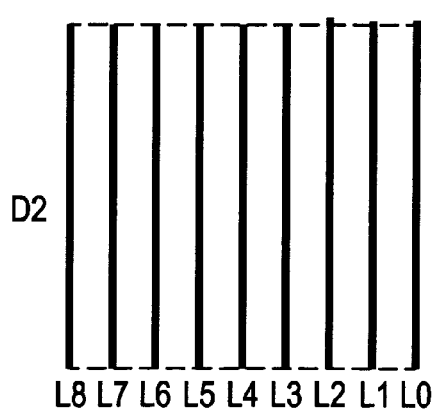
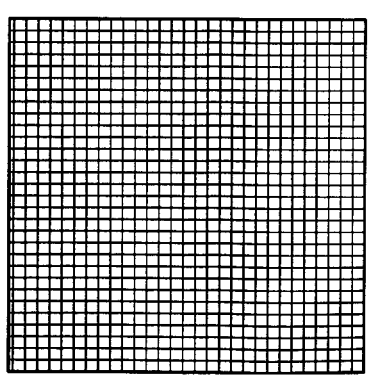

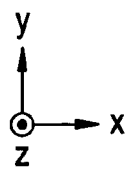 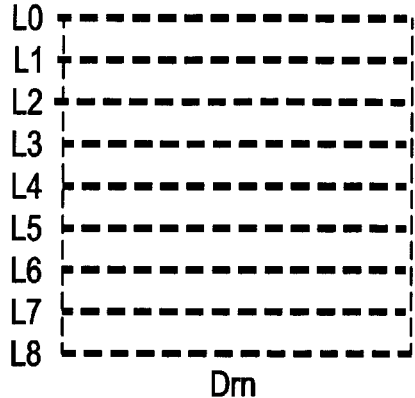
FIG. 29 Pn view=0°
Drn
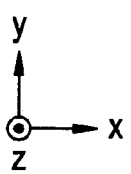 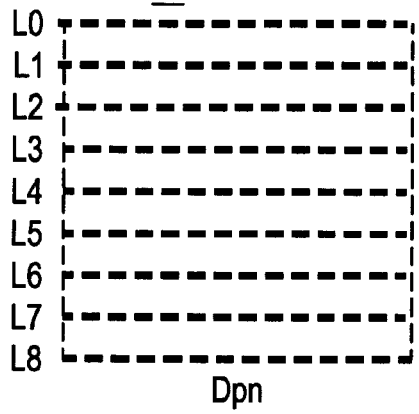
FIG. 30 Pn view=0°
Dpn
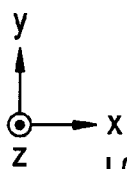 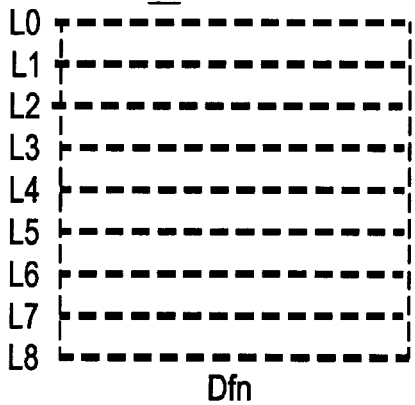
FIG. 31 Pn view=0°
Dfn
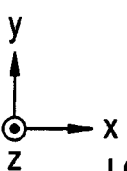 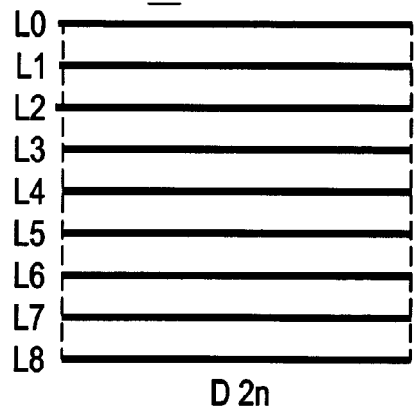
FIG. 32 Pn view=0°
D 2n
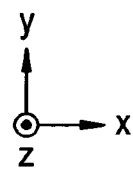 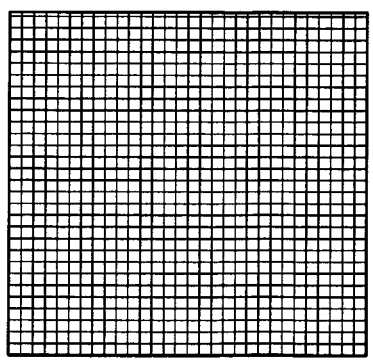
FIG. 33 Pn view=0°
D2n (0°, x, y)

CT IMAGE PRODUCING METHOD AND X-RAY CT APPARATUS

CROSS REFERENCE TO RELATED APPLICATIONS

This application claims the benefit of Japanese Application No. 2004-065003 filed Mar. 9, 2004.

BACKGROUND OF THE INVENTION

The present invention relates to a CT (computed tomography) image producing method and an X-ray CT apparatus, and more particularly to a CT image producing method and an X-ray CT apparatus for producing a CT image by applying Z-filtering to axial scan data collected using a multi-row detector.

Conventionally, there is known a technique of producing a CT image by applying Z-filtering to helical scan data collected using a multi-row detector (see Non-patent Document 1, for example).

[Non-patent Document 1] "New Heights in Multi-slice CT" (Japanese original title: "Kiwameru Multi-slice CT"), edited and written by Yasuyuki Yamashita, published by Chugai Igakusha, Apr. 15, 2001 (pp. 23–24).

However, no technique for producing a CT image by applying Z-filtering to axial scan data collected using a multi-row detector is known.

SUMMARY OF THE INVENTION

It is therefore an object of the present invention to provide a CT image producing method and an X-ray CT apparatus for producing a CT image by applying Z-filtering to axial scan data collected using a multi-row detector.

In its first aspect, the present invention provides a CT image producing method characterized in comprising: collecting first axial scan data while rotating at least one of an X-ray tube and a multi-row detector relative to and around a subject to be imaged at a first position in a direction of a body axis of the subject to be imaged; extracting from said first axial scan data projection data corresponding to a plurality of reconstruction fields arranged in the direction of the body axis of the subject to be imaged; if part of projection data of a reconstruction field near an end of said multi-row detector cannot be extracted from said first axial scan data, collecting second axial scan data while rotating at least one of said X-ray tube and multi-row detector relative to and around the subject to be imaged at a second position to which said X-ray tube and multi-row detector are rectilinearly moved relative to the subject to be imaged from said first position toward the end of said multi-row detector; extracting from said second axial scan data the projection data that could not be extracted from said first axial scan data of the reconstruction field near the end of said multi-row detector; and producing one CT image based on said extracted projection data of the reconstruction fields.

When a multi-row detector 24 is used as shown in FIG. 7, since an X-ray beam CB has a cone-beam shape, there is a possibility that projection data corresponding to a central portion a2 of a reconstruction field P3 near an end of the multi-row detector 24 cannot be extracted from axial scan data at a first position Z1.

According to the CT image producing method of the first aspect, as shown in FIG. 10, second axial scan data is collected at a second position Z2 to which the X-ray tube 21 and multi-row detector 24 are rectilinearly moved relative to the subject to be imaged from the first position Z1 toward the end of the multi-row detector 24, and projection data corresponding to the central portion a2 of the reconstruction field P3 near the multi-row detector 24 is extracted from the second axial scan data. One CT image is then produced by applying Z-filtering based on the projection data of the reconstruction fields P1, P2 and P3, and therefore omission of projection data is avoided, thus improving image quality.

As used herein, the phrase "rotating relative to" or the like includes: for a subject to be imaged placed in between the X-ray tube and multi-row detector, rotating at least one of the X-ray tube and multi-row detector around the subject to be imaged without rotating the subject to be imaged; rotating the subject to be imaged around its axis without rotating the X-ray tube and multi-row detector; and rotating the subject to be imaged around its axis and rotating at least one of the X-ray tube and multi-row detector around the subject to be imaged.

As used herein, the phrase "rectilinearly moving relative to" or the like includes: for a subject to be imaged placed in between the X-ray tube and multi-row detector, rectilinearly moving the subject to be imaged (or the table on which the subject to be imaged is laid) without rectilinearly moving the X-ray tube and multi-row detector; rectilinearly moving the X-ray tube and multi-row detector without rectilinearly moving the subject to be imaged (or the table on which the subject to be imaged is laid); and rectilinearly moving the subject to be imaged (or the table on which the subject to be imaged is laid) and rectilinearly moving the X-ray tube and multi-row detector.

In its second aspect, the present invention provides the CT image producing method having the aforementioned configuration, characterized in that: said second position is a position distant from said first position by a cone beam width at a center of rotation.

As shown in FIG. 9, for an X-ray beam CB2 at the second position Z2 to cover a space that an X-ray beam CB1 at the first position Z1 does not traverse, a distance L between the first position Z1 and second position Z2 may be set to be equal to a cone beam width W at the center of X-ray rotation IC.

According to the CT image producing method of the second aspect, the second position Z2 is defined as a position distant from the first position Z1 by the cone beam width W at the center of rotation IC. The distance L between the first position Z1 and second position Z2 may be smaller than the cone beam width W at the center of X-ray rotation IC if partial overlap of data is tolerated, while the distance L between the first position Z1 and second position Z2 may be larger than the cone beam width W at the center of X-ray rotation IC if partial omission of data is tolerated.

In its third aspect, the present invention provides the CT image producing method having the aforementioned configuration, characterized in comprising: determining combined projection data by applying weighted addition to said extracted projection data across the reconstruction fields; and producing one CT image from said combined projection data.

According to the CT image producing method of the third aspect, since weighted addition (Z-filtering) is applied to a projection data stage, the amount of calculation is reduced.

In its fourth aspect, the present invention provides the CT image producing method having the aforementioned configuration, characterized in that: a weight for the weighted addition on said projection data is determined from a mutual relationship between the reconstruction fields, and from a predetermined weighting function.

According to the CT image producing method of the fourth aspect, the profile of a CT image in the thickness direction can be controlled by selection of the weighting function.

In its fifth aspect, the present invention provides the CT image producing method having the aforementioned configuration, characterized in comprising: producing respective CT images from said extracted projection data of the reconstruction fields; and applying weighted addition to said CT images to produce one CT image.

According to the CT image producing method of the fifth aspect, since weighted addition (Z-filtering) is applied after obtaining CT images of reconstruction fields, CT images of the reconstruction fields and one CT image combining them can be simultaneously obtained.

In its sixth aspect, the present invention provides the CT image producing method having the aforementioned configuration, characterized in that: a weight for the weighted addition on said CT images is determined from a mutual relationship between the reconstruction fields, and from a predetermined weighting function.

According to the CT image producing method of the sixth aspect, the profile of a CT image in the thickness direction can be controlled by selection of the weighting function.

In its seventh aspect, the present invention provides the CT image producing method having the aforementioned configuration, characterized in comprising: extracting from said first axial scan data projection data corresponding to one line or a plurality of parallel lines at spacings of a plurality of pixels on each of said reconstruction planes; if part of projection data of a reconstruction field near an end of said multi-row detector cannot be extracted from said first axial scan data, extracting the projection data from said second axial scan data; generating projection line data by multiplying said projection data by a cone beam reconstruction weight; determining combined projection line data by applying weighted addition to said projection line data of corresponding lines across the reconstruction fields; generating image-positional line data by filtering said combined projection line data; determining backprojected pixel data of pixels on an image plane based on said image-positional line data; determining backprojected data by adding the backprojected pixel data on a pixel-by-pixel basis across all views used in image reconstruction; and thereby producing one CT image.

According to the CT image producing method of the seventh aspect, since projection data corresponding to lines is processed, the amount of calculation is reduced. Moreover, since the weighted addition (Z-filtering) is applied to a projection line data stage, the amount of calculation is reduced.

In its eighth aspect, the present invention provides the CT image producing method having the aforementioned configuration, characterized in comprising: extracting from said first axial scan data projection data corresponding to one line or a plurality of parallel lines at spacings of a plurality of pixels on each of said reconstruction planes; if part of projection data of a reconstruction field near an end of said multi-row detector cannot be extracted from said first axial scan data, extracting the projection data from said second axial scan data; generating projection line data by multiplying said projection data by a cone beam reconstruction weight; generating image-positional line data by filtering said projection line data; determining backprojected pixel data on an image plane based on said image-positional line data; determining backprojected data by adding the backprojected pixel data on a pixel-by-pixel basis across all views used in image reconstruction; applying weighted addition to the corresponding backprojected data across said reconstruction fields; and producing one CT image.

According to the CT image producing method of the eighth aspect, since projection data corresponding to lines is processed, the amount of calculation is reduced. Moreover, since weighted addition (Z-filtering) is applied after determining backprojected data of the reconstruction fields, CT images of the reconstruction fields and one CT image combining them can be simultaneously obtained.

In its ninth aspect, the present invention provides an X-ray CT apparatus characterized in comprising: an X-ray tube; a multi-row detector; first axial scanning means for collecting first axial scan data while rotating at least one of said X-ray tube and multi-row detector relative to and around a subject to be imaged at a first position in a direction of a body axis of the subject to be imaged; first projection data extracting means for extracting from said first axial scan data projection data corresponding to a plurality of reconstruction fields arranged in the direction of the body axis of the subject to be imaged; second axial scanning means for, if part of projection data of a reconstruction field near an end of said multi-row detector cannot be extracted from said first axial scan data, collecting second axial scan data while rotating at least one of said X-ray tube and multi-row detector relative to and around the subject to be imaged at a second position to which said X-ray tube and multi-row detector are rectilinearly moved relative to the subject to be imaged from said first position toward the end of said multi-row detector; second projection data extracting means for extracting from said second axial scan data the projection data that could not be extracted from said first axial scan data of the reconstruction field near the end of said multi-row detector; and CT image producing means for producing one CT image based on said extracted projection data of the reconstruction fields.

According to the X-ray CT apparatus of the ninth aspect, the CT image producing method of the first aspect can be suitably implemented.

In its tenth aspect, the present invention provides the X-ray CT apparatus having the aforementioned configuration, characterized in that: said second position is a position distant from said first position by a cone beam width at a center of rotation.

According to the X-ray CT apparatus of the tenth aspect, the CT image producing method of the second aspect can be suitably implemented.

In its eleventh aspect, the present invention provides the X-ray CT apparatus having the aforementioned configuration, characterized in that: said CT image producing means determines combined projection data by applying weighted addition to said extracted projection data across the reconstruction fields, and produces one CT image from said combined projection data.

According to the X-ray CT apparatus of the eleventh aspect, the CT image producing method of the third aspect can be suitably implemented.

In its twelfth aspect, the present invention provides the X-ray CT apparatus having the aforementioned configuration, characterized in that: a weight for the weighted addition on said projection data is determined from a mutual relationship between the reconstruction fields, and from a predetermined weighting function.

According to the X-ray CT apparatus of the twelfth aspect, the CT image producing method of the fourth aspect can be suitably implemented.

In its thirteenth aspect, the present invention provides the X-ray CT apparatus having the aforementioned configuration, characterized in that: said CT image producing means produces respective CT images from said extracted projection data of the reconstruction fields, and applies weighted addition to said CT images to produce one CT image.

According to the X-ray CT apparatus of the thirteenth aspect, the CT image producing method of the fifth aspect can be suitably implemented.

In its fourteenth aspect, the present invention provides the X-ray CT apparatus having the aforementioned configuration, characterized in that: a weight for the weighted addition on said CT images is determined from a mutual relationship between the reconstruction fields, and from a predetermined weighting function.

According to the X-ray CT apparatus of the fourteenth aspect, the CT image producing method of the sixth aspect can be suitably implemented.

In its fifteenth aspect, the present invention provides the X-ray CT apparatus having the aforementioned configuration, characterized in that: said first projection data extracting means extracts from said first axial scan data projection data corresponding to one line or a plurality of parallel lines at spacings of a plurality of pixels on each of said reconstruction planes; said second projection data extracting means extracts from said second axial scan data the projection data that could not be extracted from said first axial scan data of a reconstruction field near an end of said multi-row detector; and said CT image producing means generates projection line data by multiplying said projection data by a cone beam reconstruction weight, determines combined projection line data by applying weighted addition to said projection line data of corresponding lines across said reconstruction fields, generates image-positional line data by filtering said combined projection line data, determines backprojected pixel data of pixels on an image plane based on said image-positional line data, and determines backprojected data by adding the backprojected pixel data on a pixel-by-pixel basis across all views used in image reconstruction.

According to the X-ray CT apparatus of the fifteenth aspect, the CT image producing method of the seventh aspect can be suitably implemented.

In its sixteenth aspect, the present invention provides the X-ray CT apparatus having the aforementioned configuration, characterized in that: said first projection data extracting means extracts from said first axial scan data projection data corresponding to one line or a plurality of parallel lines at spacings of a plurality of pixels on each of said reconstruction planes; said second projection data extracting means extracts from said second axial scan data the projection data that could not be extracted from said first axial scan data of a reconstruction field near an end of said multi-row detector; said CT image producing means generates projection line data by multiplying said projection data by a cone beam reconstruction weight, generates image-positional line data by filtering said projection line data, determines backprojected pixel data of pixels on an image plane based on said image-positional line data, determines backprojected data by adding the backprojected pixel data on a pixel-by-pixel basis across all views used in image reconstruction, applies weighted addition to the corresponding backprojected data across said reconstruction fields, and produces one CT image.

According to the X-ray CT apparatus of the sixteenth aspect, the CT image producing method of the eighth aspect can be suitably implemented.

According to the CT image producing method and X-ray CT apparatus of the present invention, since Z-filtering can be applied to data obtained even if it lies in a peripheral portion of an imaged region, the slice thickness can be arbitrarily controlled, and artifacts and noise can be reduced.

The CT image producing method and X-ray CT apparatus of the present invention can be used for improving image quality of a CT image.

Further objects and advantages of the present invention will be apparent from the following description of the preferred embodiments of the invention as illustrated in the accompanying drawings.

BRIEF DESCRIPTION OF THE DRAWINGS

FIG. 15 is a conceptual diagram showing projection data Drn obtained by projecting data on lines on the detector plane at a view angle view=0° onto a reconstruction field Pn.

FIG. 16 is a conceptual diagram showing projection line data Dpn obtained by multiplying the projection data Drn at the view angle view=0° by a cone beam reconstruction weight.

FIG. 17 is a conceptual diagram showing projection line data Dp obtained by weighted addition on the projection data Drn at the view angle view=0° across the reconstruction fields.

FIG. 18 is a conceptual diagram showing backprojected line data Df obtained by filtering the projection line data Dp at the view angle view=0°.

FIG. 19 is a conceptual diagram showing backprojected pixel data D2 on lines obtained from the backprojected line data Df at the view angle view=0°.

FIG. 20 is a conceptual diagram showing backprojected pixel data D2 in between lines obtained from the backprojected line data Df at the view angle view=0°.

FIG. 21 is a conceptual diagram showing projection data Drn obtained by projection data on lines on the detector plane at a view angle view=90° onto a reconstruction field Pn.

FIG. 22 is a conceptual diagram showing projection line data Dpn obtained by multiplying the projection data Drn at the view angle view=90° by a cone beam reconstruction weight.

FIG. 23 is a conceptual diagram showing projection line data Dp obtained by weighted addition on the projection data Drn at the view angle view=90° across the reconstruction fields.

FIG. 24 is a conceptual diagram showing backprojected line data Df obtained by filtering the projection line data Dp at the view angle view=90°.

FIG. 25 is a conceptual diagram showing backprojected pixel data D2 on lines obtained from the backprojected line data Df at the view angle view=90°.

FIG. 26 is a conceptual diagram showing backprojected pixel data D2 in between lines obtained from the backprojected line data Df at the view angle view=90°.

FIG. 29 is a conceptual diagram showing projection data Drn obtained by projecting data on lines on the detector plane at a view angle view=0° onto a reconstruction field Pn.

FIG. 30 is a conceptual diagram showing projection line data Dpn obtained by multiplying the projection data Drn at the view angle view=0° by a cone beam reconstruction weight.

FIG. 31 is a conceptual diagram showing backprojected line data Dfn obtained by filtering the projection line data Dpn at the view angle view=0°.

FIG. 32 is a conceptual diagram showing backprojected pixel data D2n on lines obtained from the backprojected line data Dfn at the view angle view=0°.

FIG. 33 is a conceptual diagram showing backprojected pixel data D2n in between lines obtained from the backprojected line data Dfn at the view angle view=0°.

DETAILED DESCRIPTION OF THE INVENTION

The present invention will now be described in more detail with reference to embodiments shown in the accompanying drawings. It should be noted that the present invention is not limited to the embodiments.

EXAMPLE 1

Figure 1:
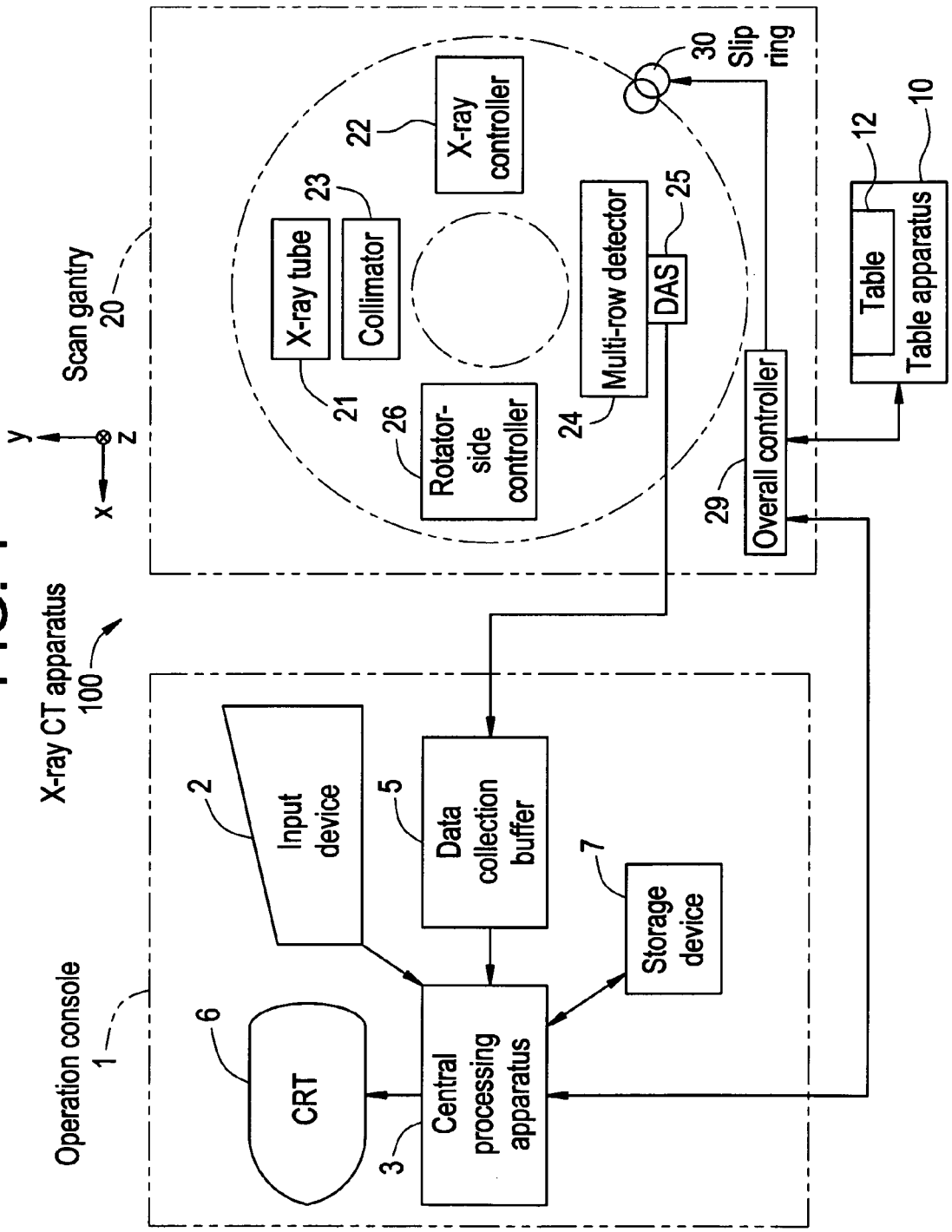
FIG. 1 is a block configuration diagram showing an X-ray CT apparatus in accordance with Example 1.

FIG. 1 is a block configuration diagram showing an X-ray CT apparatus 100 in accordance with Example 1.

The X-ray CT apparatus 100 comprises an operation console 1, a table apparatus 10, and a scan gantry 20.

The operation console 1 comprises an input device 2 for accepting inputs by a human operator, a central processing apparatus 3 for executing scan control processing, image reconstruction processing etc., a data collection buffer 5 for collecting data acquired at the scan gantry 20, a CRT 6 for displaying a produced CT image, and a storage device 7 for storing programs, data, and CT images.

The table apparatus 10 comprises a table 12 for laying thereon a subject to be imaged and transporting the subject into/out of a bore (cavity portion) of the scan gantry 20. The table 12 is vertically and horizontally/rectilinearly moved by a motor incorporated in the table apparatus 10.

The scan gantry 20 comprises an X-ray tube 21, an X-ray controller 22, a collimator 23, a multi-row detector 24, a DAS (data acquisition system) 25, a rotator-side controller 26 for controlling the X-ray controller 22, collimator 23 and DAS 25, an overall controller 29 for communicating control signals etc. with the operation console 1 and imaging table 10, and a slip ring 30.

Figure 2:
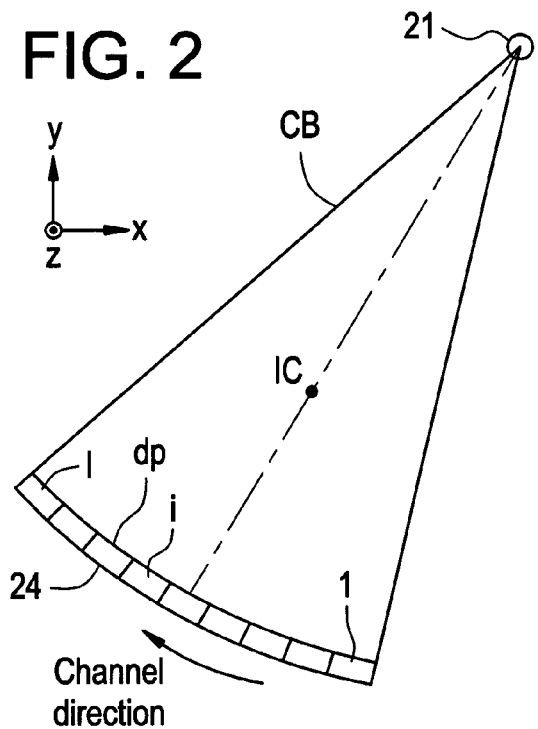
FIG. 2 is an explanatory diagram showing a rotation of an X-ray tube and a multi-row detector.
Figure 3:
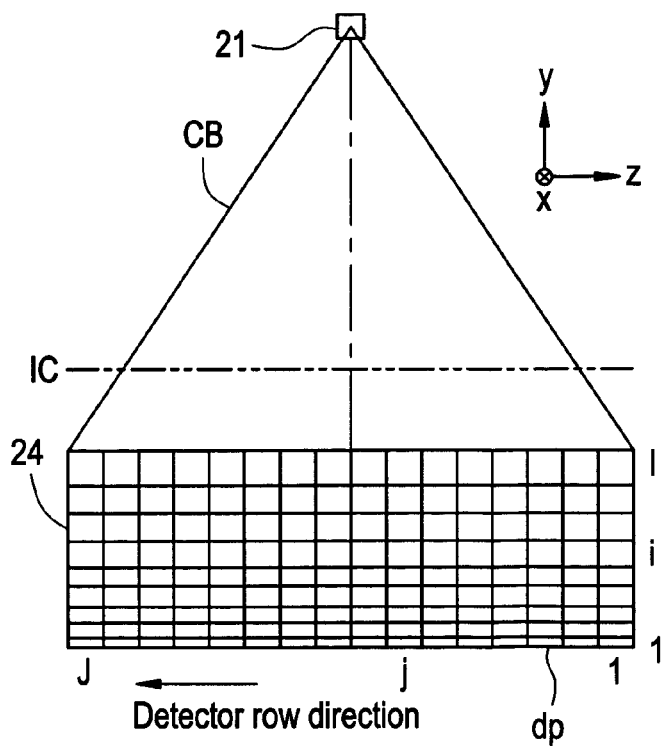
FIG. 3 is an explanatory diagram showing a cone beam.

FIGS. 2 and 3 are explanatory diagrams of the X-ray tube 21 and multi-row detector 24.

The X-ray tube 21 and multi-row detector 24 rotate around a center of rotation IC. Representing the direction of rectilinear motion of the table 12 as z-direction, a direction perpendicular to the upper surface of the table 12 as y-direction, and a direction orthogonal to the z- and y-directions as x-direction, a plane of rotation of the X-ray tube 21 and multi-row detector 24 is an x-y plane.

The X-ray tube 21 generates an X-ray beam CB generally referred to as a cone beam. When the direction of the center axis of the X-ray beam CB is parallel to the y-direction, a view angle view=0° is defined.

The multi-row detector 24 has J (e.g., J=256) detector rows. Each detector row has I (e.g., I=1,024) channels.

Figure 4:
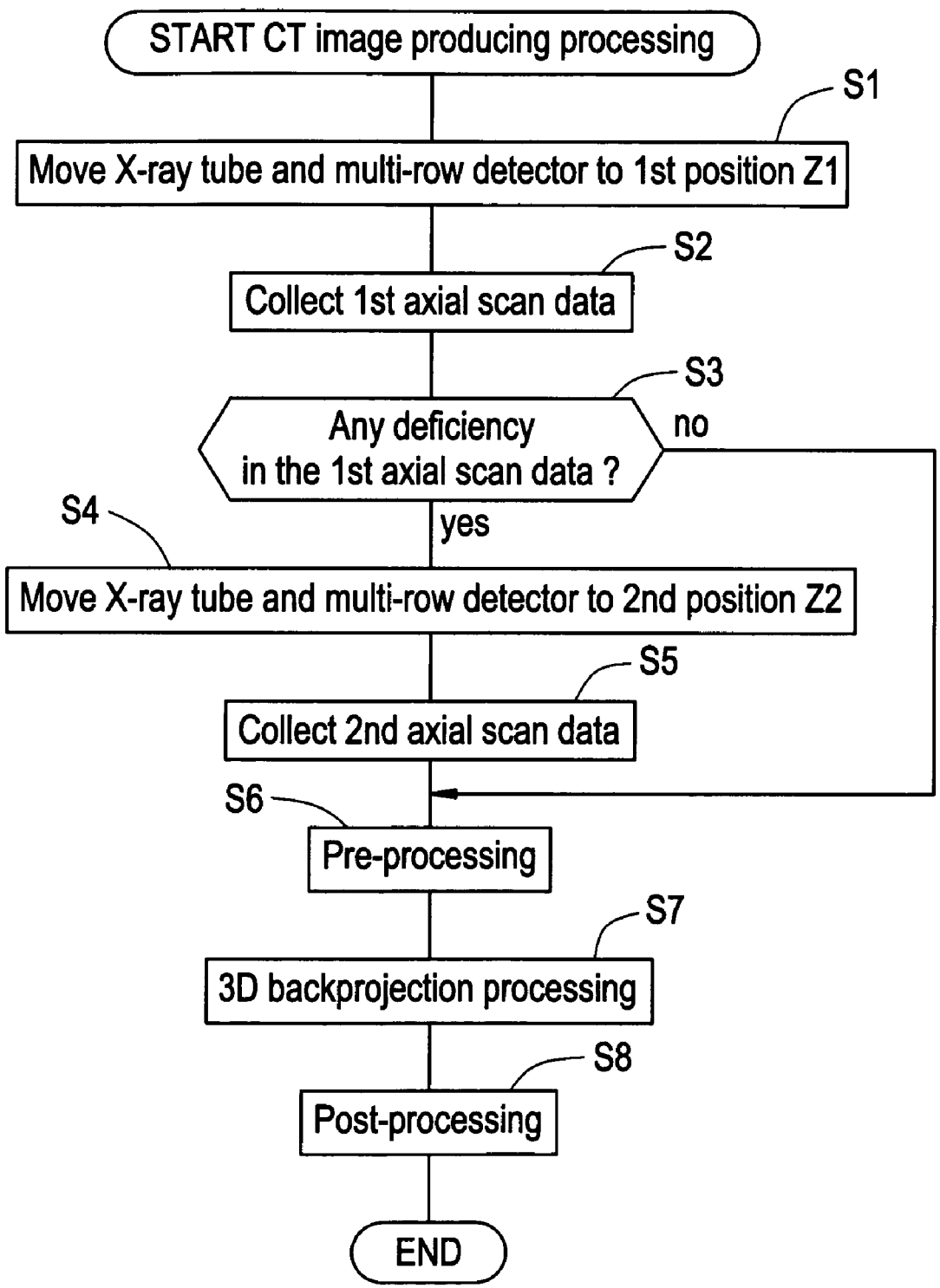
FIG. 4 is a flow chart showing CT image producing processing.

FIG. 4 is a flow chart showing data collection processing.

Figures 5, 6:
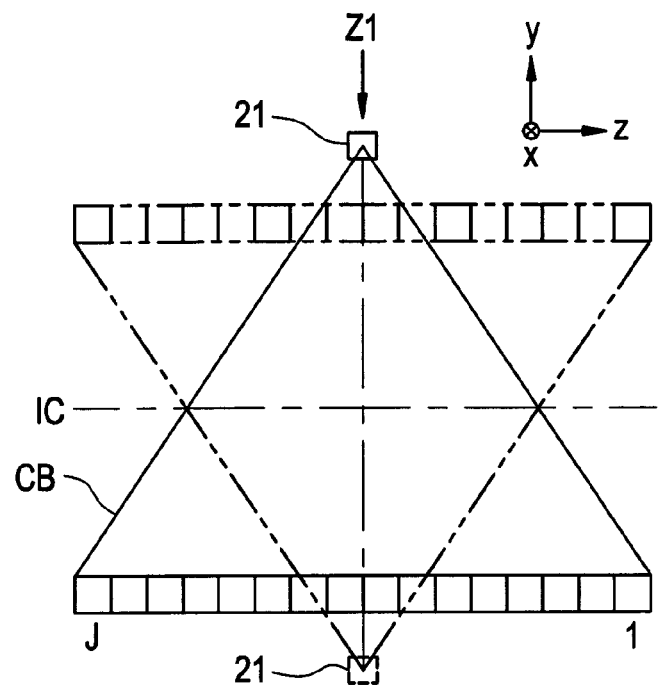
FIG. 5 is a conceptual diagram showing an axial scan at a first position.
FIG. 6 is an explanatory diagram showing a format for storing collected data.

At Step S1, the X-ray tube 21 and multi-row detector 24 are moved to a first position Z1 as shown in FIG. 5 (in practice, the table 12 is rectilinearly moved).

At Step S2, first axial scan data D0(Z1, view, j, i) is collected while rotating the X-ray tube 21 and multi-row detector 24 around the center of rotation IC, as shown in FIG. 5. FIG. 6 shows a format of storage of the collected axial scan data.

At Step S3, a decision is made as to whether any data is deficient in the first axial scan data D0(Z1, view, j, i) based on the position of a reconstruction field, and if so, the process goes to Step S4; otherwise, to Step S6.

Figure 7:
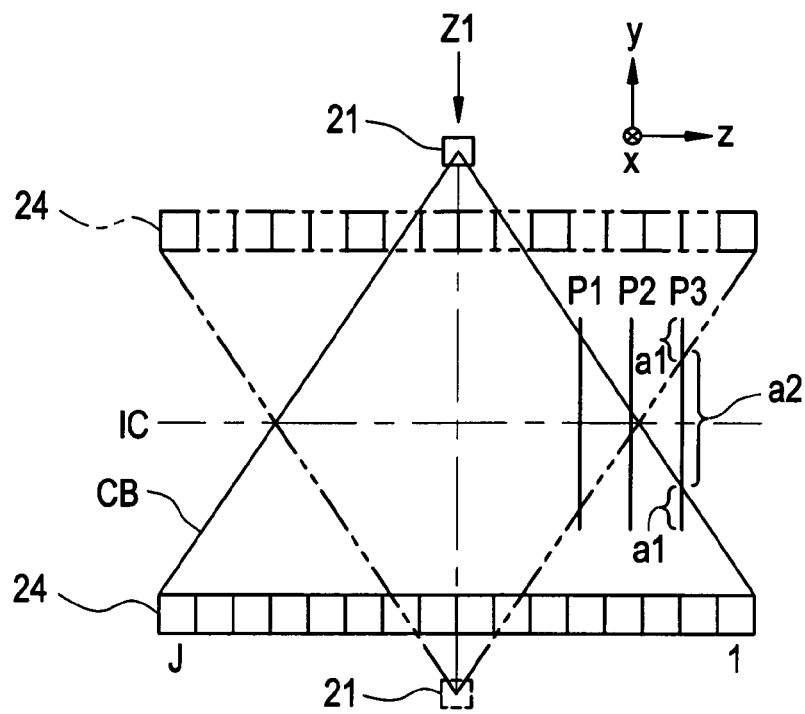
FIG. 7 is an explanatory diagram showing deficient data in the first axial scan data.

For example, assuming that reconstruction fields P1, P2 and P3 are defined as shown in FIG. 7, the reconstruction fields P1 and P2 have no deficient data in the first axial scan data D0(Z1, view, j, i), although the reconstruction field P3 has deficient data in a central portion a2 because the first axial scan data D0(Z1, view, j, i) covers only a peripheral portion a1.

Figure 8:
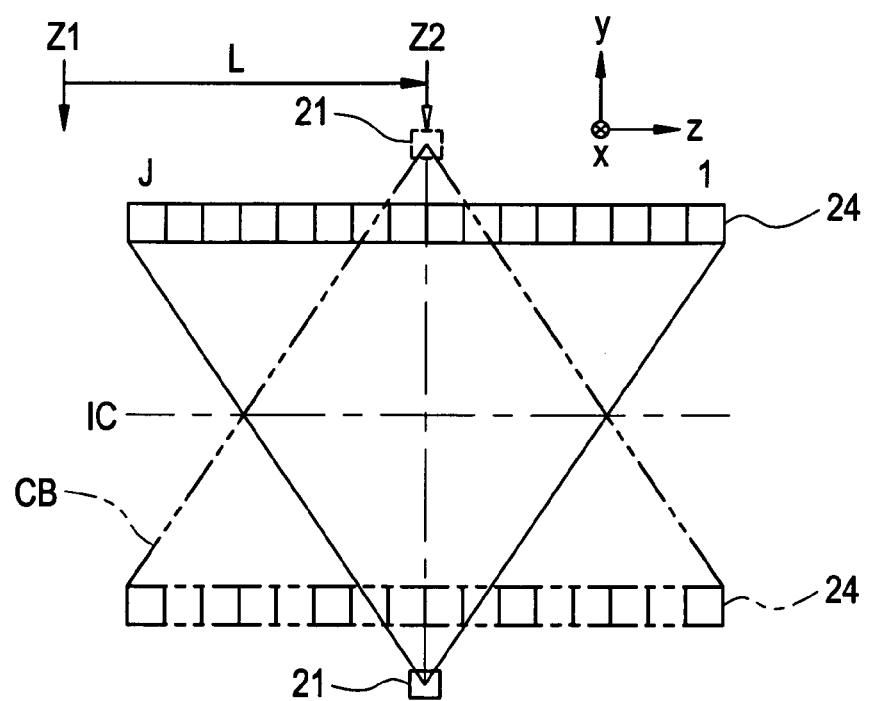
FIG. 8 is a conceptual diagram showing an axial scan at a second position.

At Step S4, the X-ray tube 21 and multi-row detector 24 are moved to a second position Z2, as shown in FIG. 8 (in practice, the table 12 is rectilinearly moved).

At Step S5, second axial scan data D0(Z2, view, j, i) is collected while rotating the X-ray tube 21 and multi-row detector 24 around the center of rotation IC, as shown in FIG. 8. The process then goes to Step S6.

Figure 9:
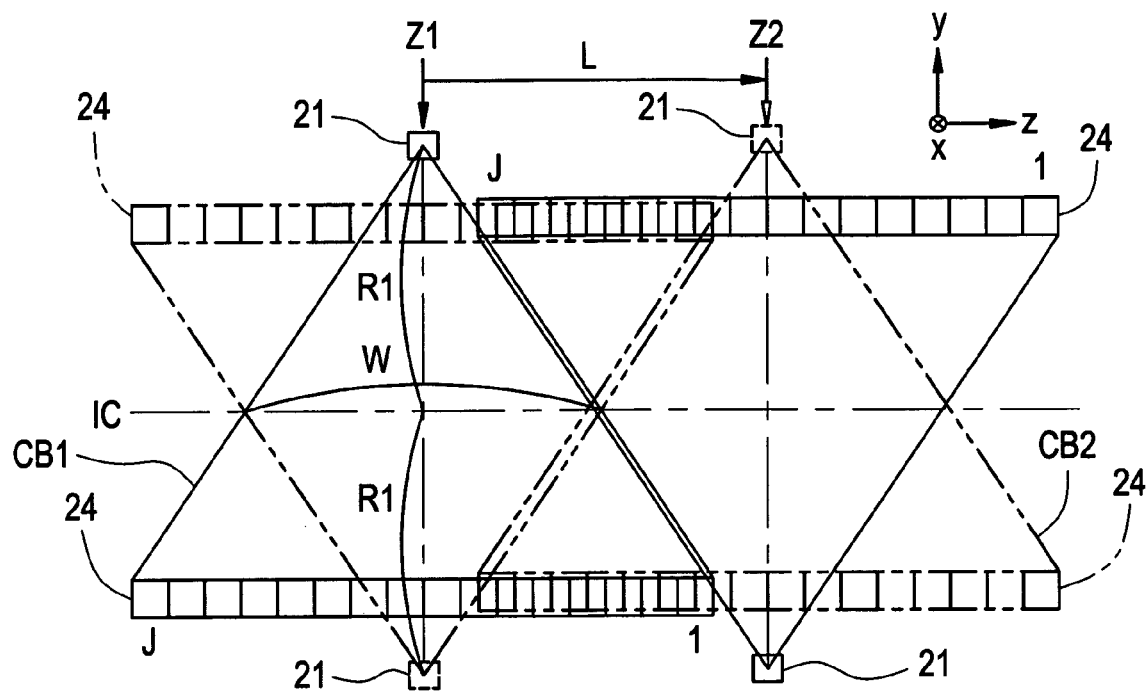
FIG. 9 is an explanatory diagram showing a distance between the first and second positions.

As shown in FIG. 9, for an X-ray beam CB2 at the second position Z2 to cover a space that an X-ray beam CB1 at the first position Z1 does not traverse, a distance L between the first position Z1 and second position Z2 may be set to be equal to a cone beam width W at the center of X-ray rotation IC.

Figure 10:
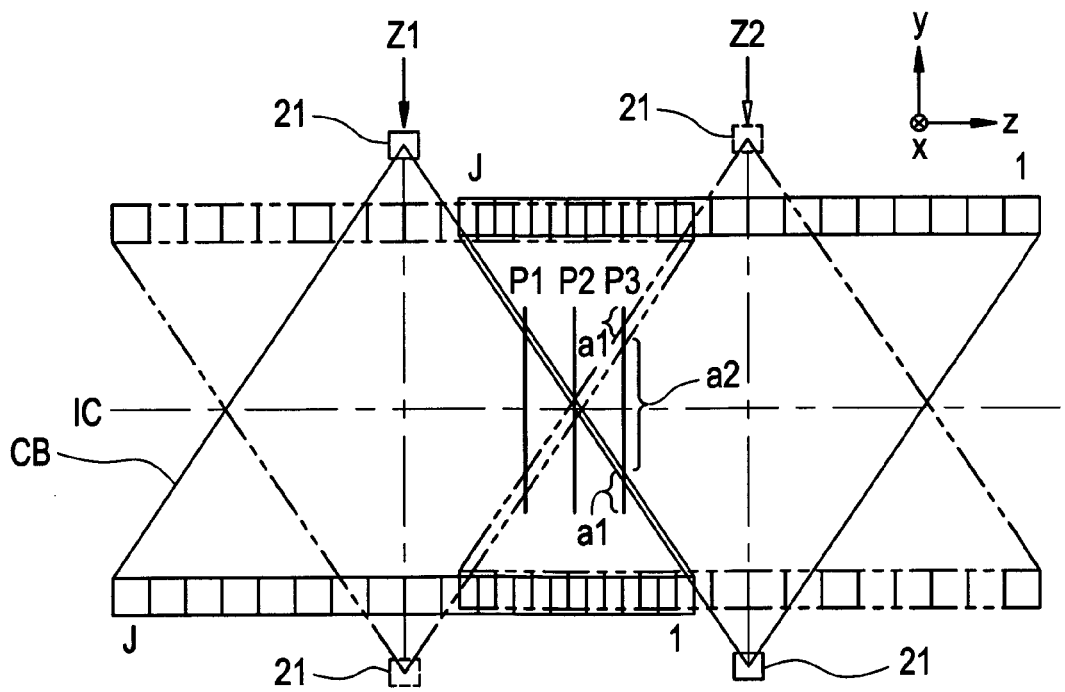
FIG. 10 is a conceptual diagram showing complement of deficient data in the first axial scan data by the second axial scan data.

Then, data of the central portion a2 in the reconstruction field P3 can be obtained from the second axial scan data D0(Z2, view, j, i) as shown in FIG. 10.

At Step S6, the data D0(Z1, view, j, i) and data D0(Z2, view, j, i) are subjected to pre-processing (offset correction, log correction, X-ray dose correction and sensitivity correction).

At Step S7, the pre-processed data D0(Z1, view, j, i) and D0(Z2, view, j, i) are subjected to three-dimensional backprojection processing (which will be discussed later with reference to FIG. 11) to determine backprojected data D3(x, y).

At Step S8, the backprojected data D3(x, y) is subjected to post-processing to obtain a CT image.

Figure 11:
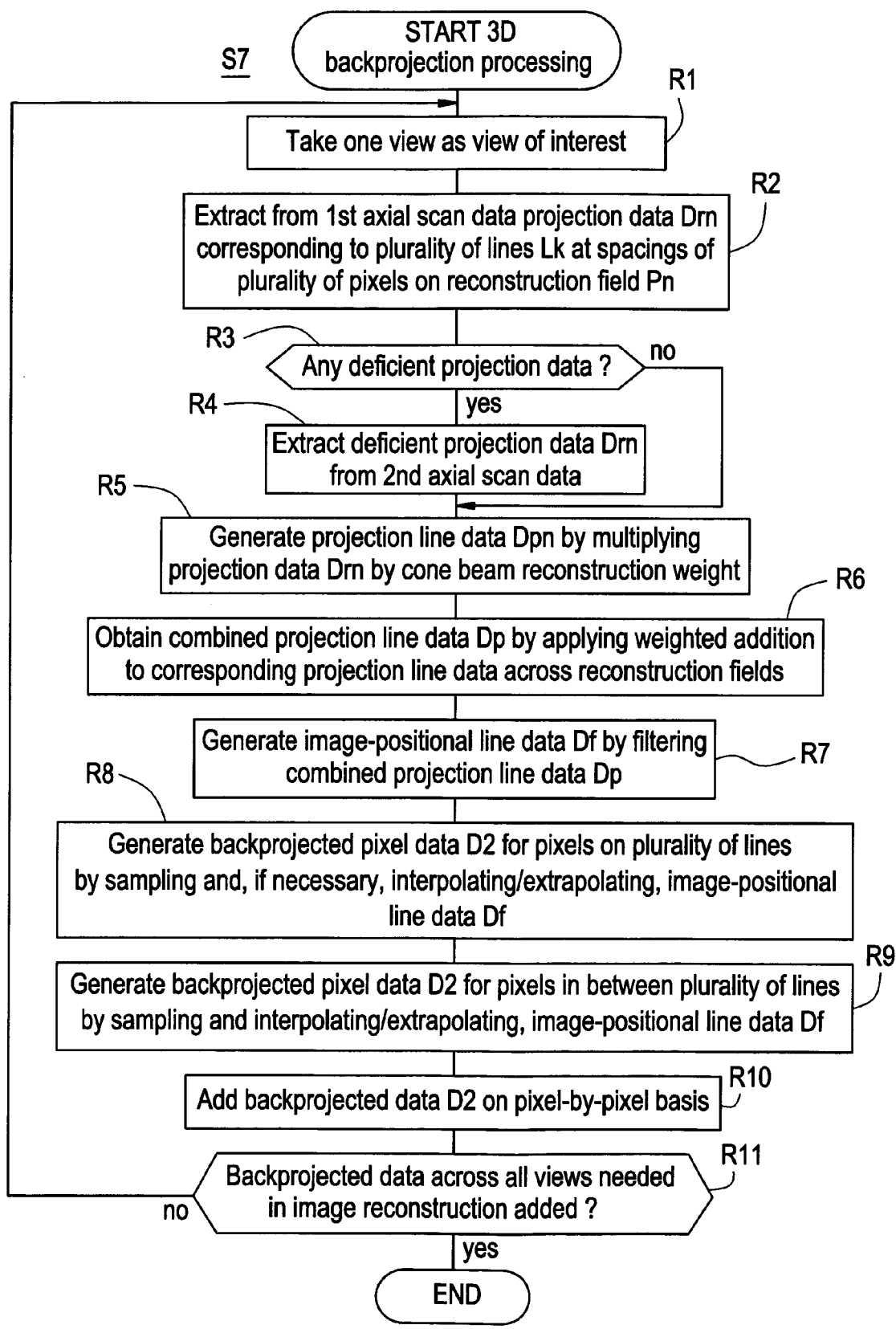
FIG. 11 is a flow chart showing details of three-dimensional image reconstruction processing in accordance with Example 1.

FIG. 11 is a flow chart showing details of the three-dimensional backprojection processing (Step S7 in FIG. 4).

At Step R1, one view is taken as a view of interest in a view range needed in image reconstruction. The view range is, for example, "180°+fan angle" or "360°."

At Step R2, projection data Drn corresponding to a plurality of parallel lines at spacings of a plurality of pixels on a reconstruction field Pn (n=1, 2, . . . ) is extracted from among the first axial scan data D0(z1, view, j, i) at the view of interest.

It should be noted that the reconstruction fields P1, P2 and P3 are hereinbelow assumed as shown in FIG. 10.

Figure 12A:
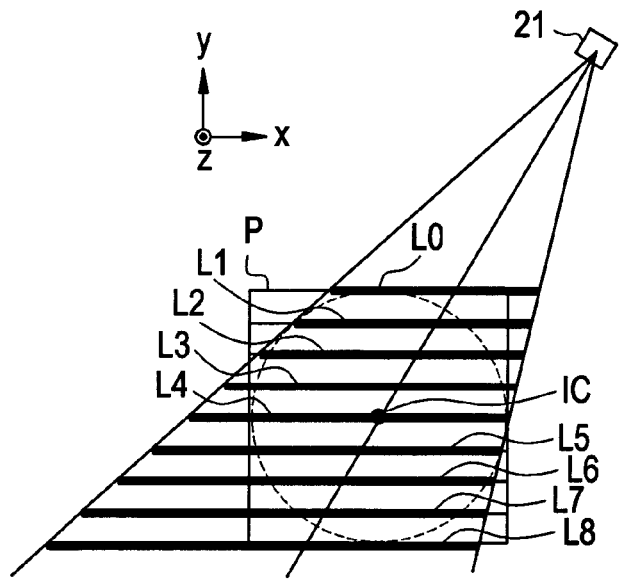
FIGS. 12a and 12b are conceptual diagrams showing lines on a reconstruction plane P1 projected in the direction of X-ray transmission.
Figure 12B:
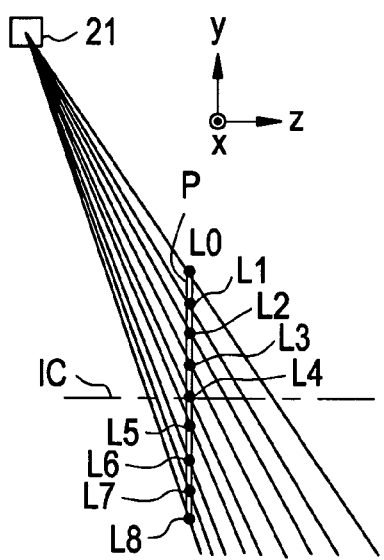

FIG. 12 exemplarily shows a plurality of parallel lines L0–L8 on the reconstruction plane P1.

The number of lines is 1/64–1/2 of the maximum number of pixels in a reconstruction plane in a direction orthogonal to the lines. For example, if the number of pixels in a reconstruction plane P is 512×512, the number of lines is nine.

Moreover, the line direction is defined as the x-direction for −45°≦view<45° (or a view angle range mainly including the range and also including its vicinity) and 135°≦view<225° (or a view angle range mainly including the range and also including its vicinity). The line direction is defined as the y-direction for 45°≦view<135° (or a view angle range mainly including the range and also including its vicinity) and 225°≦view<315° (or a view angle range mainly including the range and also including its vicinity).

Figure 13:
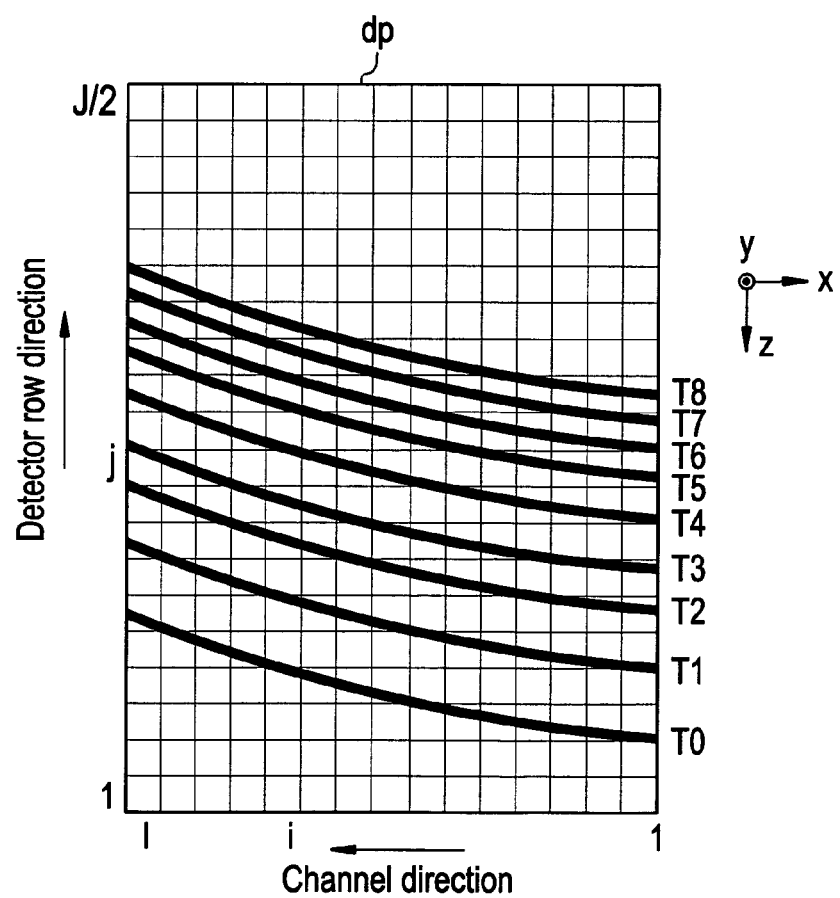
FIG. 13 is a conceptual diagram showing lines on the reconstruction plane P1 projected onto a detector plane.

FIG. 13 shows lines T0–T8 formed by projecting the plurality of parallel lines L0–L8 on the reconstruction plane P1 onto a detector plane dp in a direction of X-ray transmission.

The direction of X-ray transmission is determined by the geometry of the X-ray tube 21, multi-row detector 24 and lines L0–L8.

The projection data Dr corresponding to the lines L0–L8 can be obtained by extracting data at the detector row j and channel i corresponding to the lines T0–T8 projected onto the detector plane dp.

Then, as shown in FIG. 15, data corresponding to the lines T0–T8 is extracted from among the first axial scan data D0(z1, view, j, i), and is developed as data Dr1 over the lines L0–L8 on the reconstruction field P1.

Similarly, data Dr2 is extracted for the reconstruction field P2.

Figure 14:
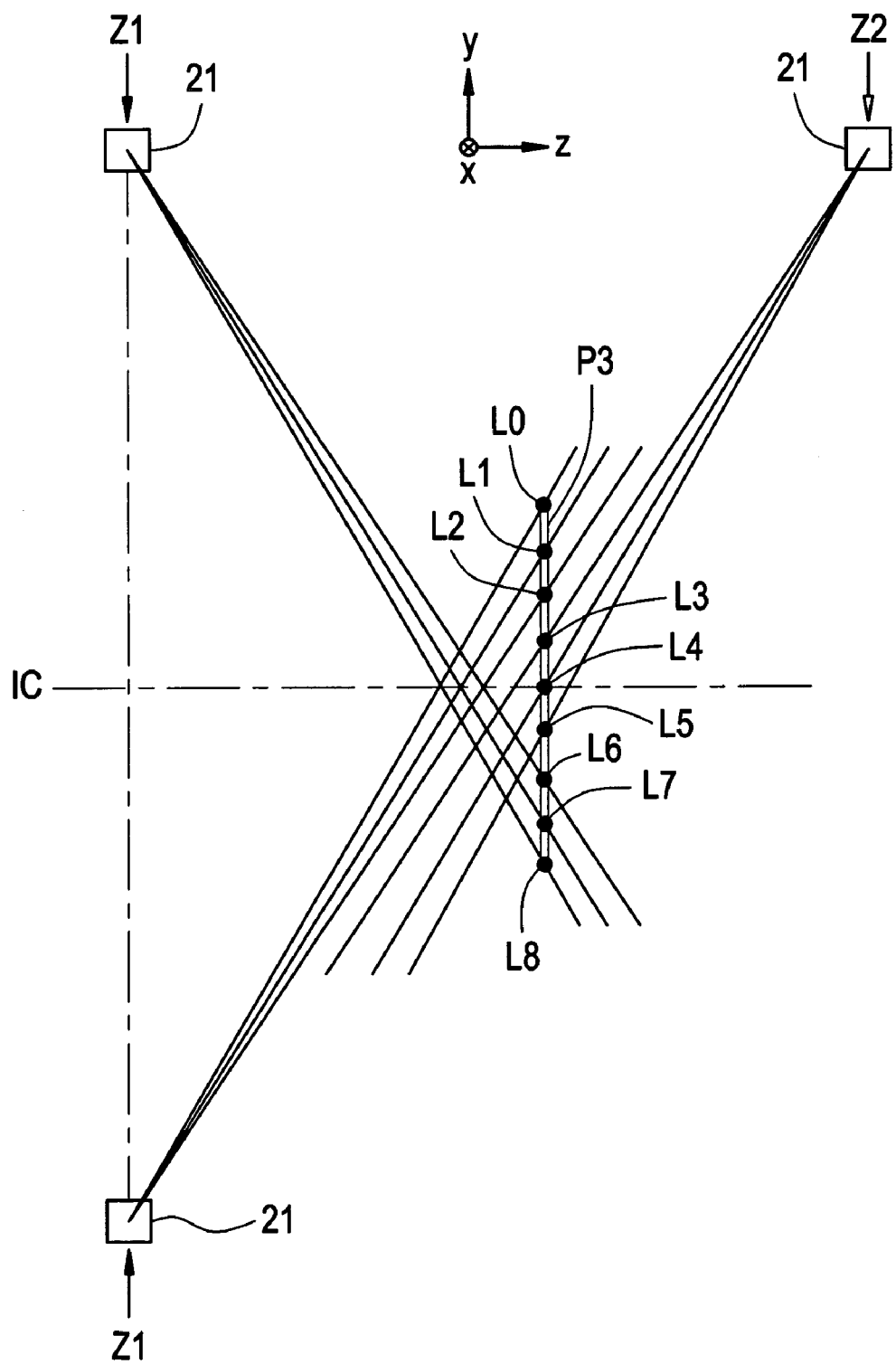
FIG. 14 is a conceptual diagram showing lines on a reconstruction plane P3 projected in the direction of X-ray transmission.

However, for the reconstruction field P3, as shown in FIG. 14, data Dr3 can be similarly extracted for the lines L0, L1, L2, L6, L7 and L8 in the peripheral portion a1, although data Dr3 cannot be extracted from the first axial scan data D0(z1, view, j, i) for the lines L3, L4 and L5 in the central portion a2.

Referring again to FIG. 11, at Step R3, if some projection data is deficient, the process goes to Step R4; otherwise, to Step R5.

At Step R4, as shown in FIG. 14, data Dr3 for the lines L3, L4 and L5 in the central portion a2 of the reconstruction field P3 is extracted from the second axial scan data D0(z2, view, j, i).

At Step R5, the projection data Drn is multiplied by a cone beam reconstruction weight to generate projection line data Dpn as shown in FIG. 16.

The cone beam reconstruction weight is $(r1/r0)^2$, where r0 is the distance from the focal spot of the X-ray tube 21 to the j-th detector row and the i-th channel of the multi-row detector 24 corresponding to projection data Drn, and r1 is the distance from the focal spot of the X-ray tube 21 to a point on the reconstruction plane Pn corresponding to the projection data Drn.

At Step R6, the projection line data Dp1, Dp2 and Dp3 are subjected to weighted addition to obtain combined projection line data Dp as shown in FIG. 17. This processing represents the Z-filtering.

Figure 41:
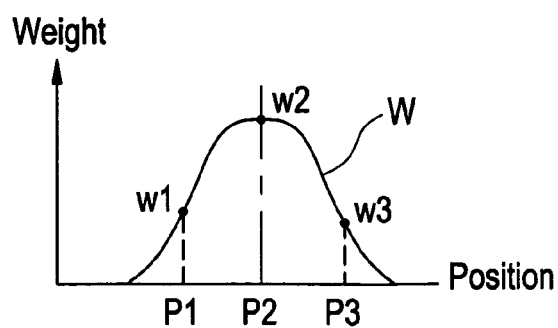
FIG. 41 is an explanatory diagram showing a weight for the weighted addition.

A weight for the weighted addition is determined from a mutual relationship between the reconstruction fields Pn, and from an appropriate weighting function W, as shown in FIG. 41.

At Step R7, the combined projection line data Dp is filtered. Specifically, the combined projection line data Dp is subjected to FFT, multiplied by a filter function (reconstruction function), and subjected to inverse FFT to generate image-positional line data Df as shown in FIG. 18.

At Step R8, the image-positional line data Df is sampled and interpolated/extrapolated as needed to obtain backprojected pixel data D2 of pixels on the lines L0–L8, as shown in FIG. 19.

At Step R9, the image-positional line data Df is sampled and interpolated/extrapolated to obtain backprojected pixel data D2 of pixels in between the lines L0–L8, as shown in FIG. 20.

In FIGS. 15–20, −45°≦view<45° (or a view angle range mainly including the range and also including its vicinity) and 135°≦view<225° (or a view angle range mainly including the range and also including its vicinity) are assumed, while FIGS. 21–26 are applied for 45°≦view<135° (or a view angle range mainly including the range and also including its vicinity) and 225°≦view<315° (or a view angle range mainly including the range and also including its vicinity).

Figure 27:
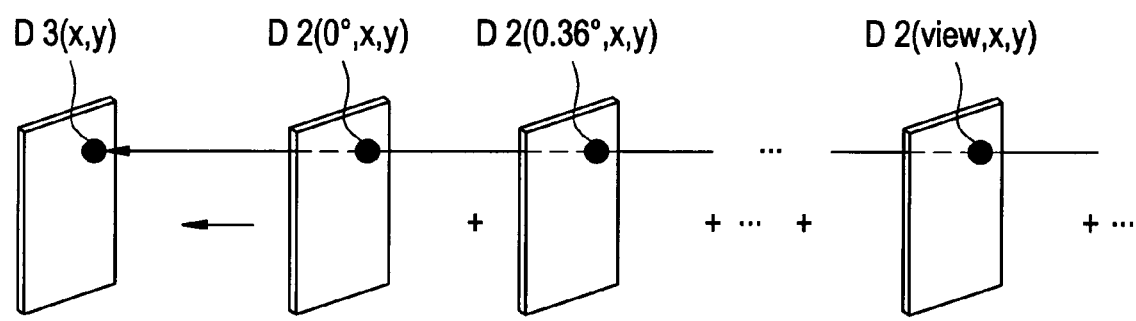
FIG. 27 is an explanatory diagram showing backprojected data D3 obtained by adding the backprojected pixel data D2 on a pixel-by-pixel basis across all views.

Referring again to FIG. 11, at Step R10, the backprojected pixel data D2 shown in FIG. 20 or 26 are added on a pixel-by-pixel basis, as shown in FIG. 27.

At Step R1, Steps R1–R10 are repeated across all views needed in image reconstruction to obtain backprojected data D3(x, y). The process is then terminated.

According to the X-ray CT apparatus 100 of Example 1, first axial scan data is collected at the first position Z1, second axial scan data is collected at the second position Z2, deficient data in the first axial scan data is complemented by the second axial scan data to generate projection data of the reconstruction fields P1, P2 and P3, and the projection data are subjected to Z-filtering to produce one CT image; therefore, omission of projection data is avoided, thus improving image quality. Moreover, since the Z-filtering is applied to a projection data stage, the amount of calculation is reduced.

EXAMPLE 2

Figure 28:
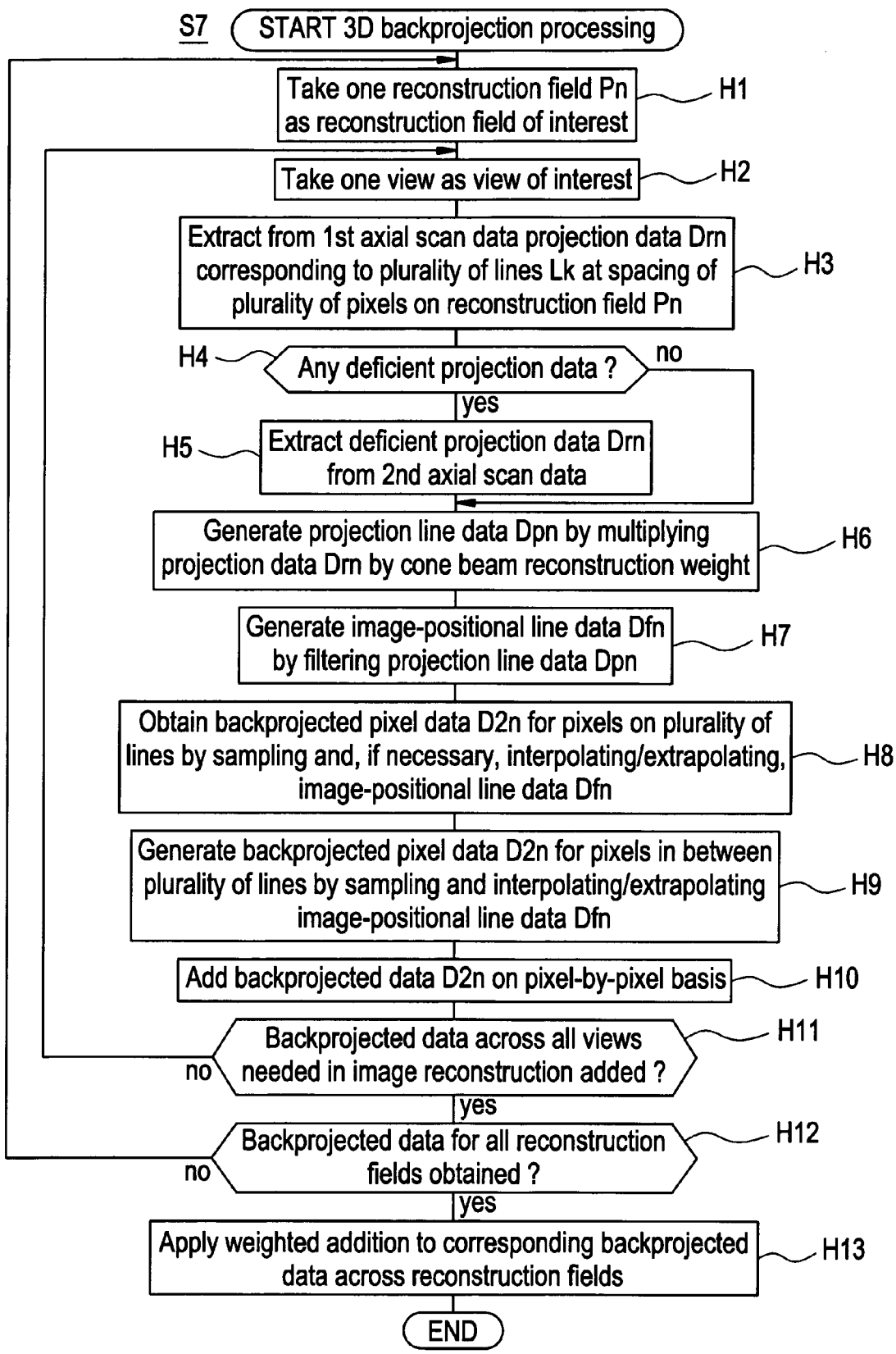
FIG. 28 is a flow chart showing details of three-dimensional image reconstruction processing in accordance with Example 2.
Figure 34:
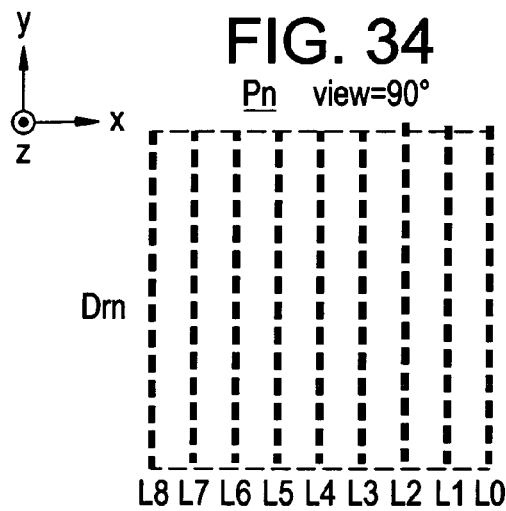
FIG. 34 is a conceptual diagram showing projection data Drn obtained by projecting data on lines on the detector plane at a view angle view=90° onto a reconstruction field Pn.
Figure 35:
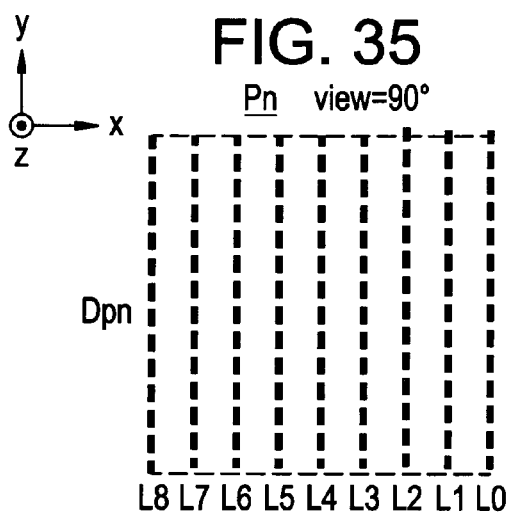
FIG. 35 is a conceptual diagram showing projection line data Dpn obtained by multiplying the projection data Drn at the view angle view=90° by a cone beam reconstruction weight.
Figure 36:
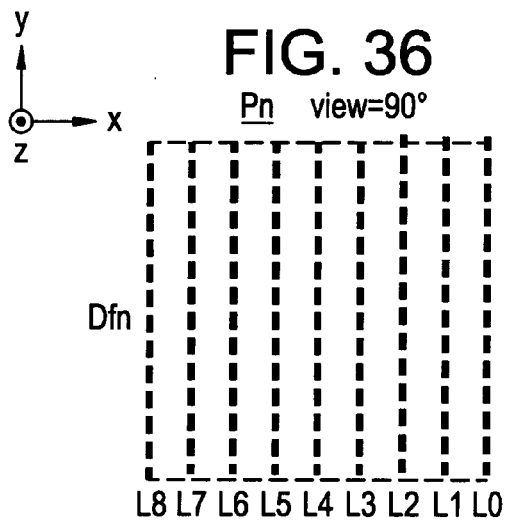
FIG. 36 is a conceptual diagram showing backprojected line data Dfn obtained by filtering the projection line data Dpn at the view angle view=90°.
Figure 37:
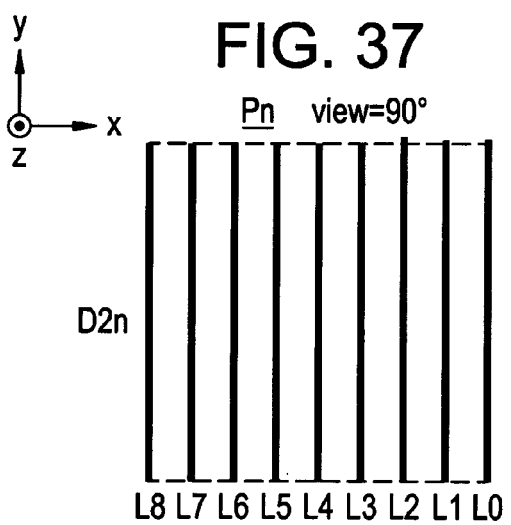
FIG. 37 is a conceptual diagram showing backprojected pixel data D2n on lines obtained from the backprojected line data Dfn at the view angle view=90°.

FIG. 28 is a flow chart showing details of the three-dimensional backprojection processing (Step S7 in FIG. 4) in accordance with Example 2.

At Step H1, one reconstruction field is taken as a reconstruction field of interest from among reconstruction fields Pn (n=1, 2, . . . ).

At Step H2, one view is taken as a view of interest in a view range needed in image reconstruction. The view range is, for example, "180°+fan angle" or "360°".

At Step H3, projection data Drn corresponding to a plurality of parallel lines at spacings of a plurality of pixels on the reconstruction field of interest Pn is extracted from among the first axial scan data D0(z1, view, j, i) at the view of interest. FIG. 29 shows the projection data Drn.

At Step H4, if any projection data is deficient, the process goes to Step H5; otherwise, to Step H6.

As described above in Example 1, the reconstruction fields P1 and P2 have no deficient projection data, although the reconstruction field P3 has deficient projection data because data Dr3 cannot be extracted from the first axial scan data D0(z1, view, j, i) for the lines L3, L4 and L5 in the central portion a2.

At Step H5, as shown in FIG. 14, data Dr3 for the lines L3, L4 and L5 in the central portion a2 of the reconstruction field P3 is extracted from the second axial scan data D0(z2, view, j, i).

At Step H6, the projection data Drn is multiplied by a cone beam reconstruction weight to generate projection line data Dpn as shown in FIG. 30.

At Step H7, the projection line data Dpn is filtered. Specifically, the projection line data Dpn is subjected to FFT, multiplied by a filter function (reconstruction function), and subjected to inverse FFT to generate image-positional line data Dfn as shown in FIG. 31.

At Step H8, the image-positional line data Dfn is sampled and interpolated/extrapolated as needed to obtain backprojected pixel data D2 of pixels on the lines L0–L8, as shown in FIG. 32.

At Step H9, the image-positional line data Dfn is sampled and interpolated/extrapolated to obtain backprojected pixel data D2 of pixels in between the lines L0–L8, as shown in FIG. 33.

In FIGS. 29–33, $-45° \leq \text{view} < 45°$ (or a view angle range mainly including the range and also including its vicinity) and $135° \leq \text{view} < 225°$ (or a view angle range mainly including the range and also including its vicinity) are assumed, while FIGS. 34–38 are applied for $45° \leq \text{view} < 135°$ (or a view angle range mainly including the range and also including its vicinity) and $225° \leq \text{view} < 315°$ (or a view angle range mainly including the range and also including its vicinity).

Figure 38:
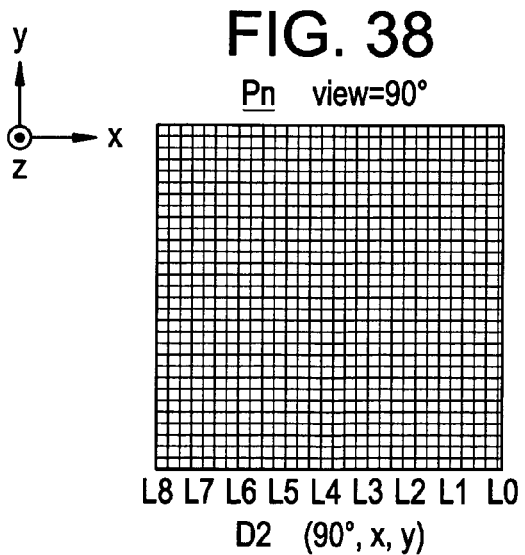
FIG. 38 is a conceptual diagram showing backprojected pixel data D2n in between lines obtained from the backprojected line data D f at the view angle view=90°.
Figure 39:
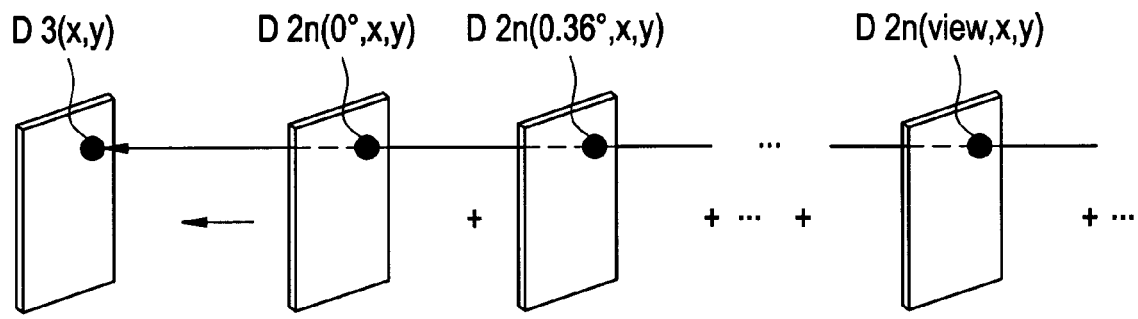
FIG. 39 is an explanatory diagram showing backprojected data D3 obtained by adding the backprojected pixel data D2n on a pixel-by-pixel basis across all views.

Referring again to FIG. 28, at Step H10, the backprojected pixel data D2 shown in FIG. 33 or 38 are added on a pixel-by-pixel basis, as shown in FIG. 39.

At Step H11, Steps H2–H10 are repeated across all views needed in image reconstruction to obtain backprojected data D3n(x, y). Once the backprojected data D3n(x, y) has been obtained for the reconstruction field Pn of interest, the process goes to Step H12.

At Step H12, Steps H1–H11 are repeated until backprojected data D3n(x, y) for all reconstruction fields Pn (n=1, 2, . . . ) are obtained; once the backprojected data D3n(x, y) for all reconstruction fields Pn have been obtained, the process goes to Step H13.

Figure 40:
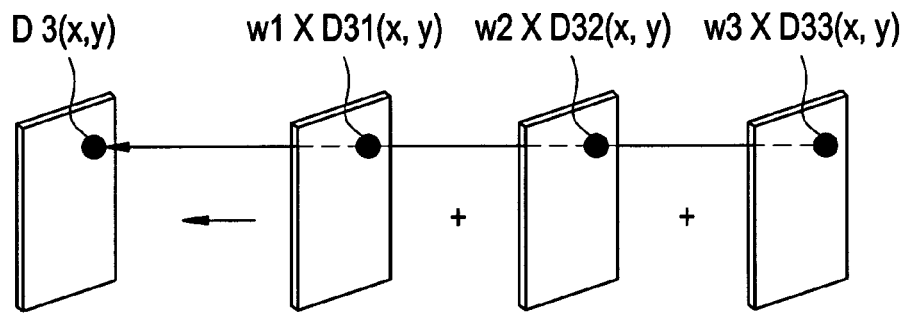
FIG. 40 is an explanatory diagram showing backprojected data D3 obtained by applying weighted addition to the backprojected data D3n on a pixel-by-pixel basis across all reconstruction fields.

At Step H13, the backprojected data D3n(x, y) for all reconstruction fields Pn are subjected to weighted addition on a pixel-by-pixel basis, as shown in FIG. 40. This processing represents the Z-filtering. The process is then terminated.

The weight wn for the weighted addition is determined from a mutual relationship between the reconstruction fields Pn, and from an appropriate weighting function W, as shown in FIG. 41.

According to the X-ray CT apparatus of Example 2, first axial scan data is collected at the first position Z1, second axial scan data is collected at the second position Z2, deficient data in the first axial scan data is complemented by the second axial scan data to generate projection data of the reconstruction field P1, P2 and P3, CT images for the reconstruction fields P1, P2 and P3 are produced from the projection data, and the CT images of the reconstruction fields P1, P2 and P3 are subjected to Z-filtering to produce one CT image; therefore, omission of projection data is avoided, thus improving image quality. Moreover, CT images of the reconstruction fields P1, P2 and P3 and a CT image combining them through Z-filtering can be simultaneously obtained.

EXAMPLE 3

The technique for image reconstruction may be a three-dimensional image reconstruction technique according to the conventionally known Feldkamp method. Moreover, three-dimensional image reconstruction techniques proposed in Japanese Patent Application Nos. 2002-147061, 2002-147231, 2002-235561, 2002-267833, 2002-322756 and 2002-338947 may be employed. Furthermore, a two-dimensional image reconstruction technique may be employed.

Many widely different embodiments of the invention may be configured without departing from the spirit and the scope of the present invention. It should be understood that the present invention is not limited to the specific embodiments described in the specification, except as defined in the appended claims.

The invention claimed is:

1. A CT image producing method comprising the steps of: collecting first axial scan data while rotating at least one of an X-ray tube and a multi-row detector relative to and around a subject to be imaged at a first position in a direction of a body axis of the subject to be imaged; extracting from said first axial scan data projection data corresponding to a plurality of reconstruction fields arranged in the direction of the body axis of the subject to be imaged; if part of projection data of a reconstruction field near an end of said multi-row detector cannot be extracted from said first axial scan data, collecting second axial scan data while rotating at least one of said X-ray tube and multi-row detector relative to and around the subject to be imaged at a second position to which said X-ray tube and multi-row detector are rectilinearly moved relative to the subject to be imaged from said first position toward the end of said multi-row detector; extracting from said second axial scan data the projection data that could not be extracted from said first axial scan data of the reconstruction field near the end of said multi-row detector; and producing one CT image based on said extracted projection data of the reconstruction fields.

2. The CT image producing method of claim 1, wherein said second position is a position distant from said first position by a cone beam width at a center of rotation.

3. The CT image producing method of claim 1, further comprising the steps of: determining combined projection data by applying weighted addition to said extracted projection data across the reconstruction fields; and producing one CT image from said combined projection data.

4. The CT image producing method of claim 3, wherein a weight for the weighted addition on said projection data is determined from a mutual relationship between the reconstruction fields, and from a predetermined weighting function.

5. The CT image producing method of claim 1, further comprising the steps of: producing respective CT images from said extracted projection data of the reconstruction fields; and applying weighted addition to said CT images to produce one CT image.

6. The CT image producing method of claim 5, wherein a weight for the weighted addition on said CT images is determined from a mutual relationship between the reconstruction fields, and from a predetermined weighting function.

7. The CT image producing method of claim 3, further comprising the steps of: extracting from said first axial scan data projection data corresponding to one line or a plurality of parallel lines at spacings of a plurality of pixels on each of said reconstruction planes; if part of projection data of a reconstruction field near an end of said multi-row detector cannot be extracted from said first axial scan data, extracting the projection data from said second axial scan data; generating projection line data by multiplying said projection data by a cone beam reconstruction weight; determining combined projection line data by applying weighted addition to said projection line data of corresponding lines across the reconstruction fields; generating image-positional line data by filtering said combined projection line data; determining backprojected pixel data of pixels on an image plane based on said image-positional line data; determining backprojected data by adding the backprojected pixel data on a pixel-by-pixel basis across all views used in image reconstruction; and thereby producing one CT image.

8. The CT image producing method of claim 5, further comprising the steps of: extracting from said first axial scan data projection data corresponding to one line or a plurality of parallel lines at spacings of a plurality of pixels on each of said reconstruction planes; if part of projection data of a reconstruction field near an end of said multi-row detector cannot be extracted from said first axial scan data, extracting the projection data from said second axial scan data; generating projection line data by multiplying said projection data by a cone beam reconstruction weight; generating image-positional line data by filtering said projection line data; determining backprojected pixel data of pixels on an image plane based on said image-positional line data; determining backprojected data by adding the backprojected pixel data on a pixel-by-pixel basis across all views used in image reconstruction; applying weighted addition to the corresponding backprojected data across said reconstruction fields; and producing one CT image.

9. An X-ray CT apparatus comprising: an X-ray tube; a multi-row detector; a first axial scanning device for collecting first axial scan data while rotating at least one of said X-ray tube and multi-row detector relative to and around a subject to be imaged at a first position in a direction of a body axis of the subject to be imaged; a first projection data extracting device for extracting from said first axial scan data projection data corresponding to a plurality of reconstruction fields arranged in the direction of the body axis of the subject to be imaged; a second axial scanning device for, if part of projection data of a reconstruction field near an end of said multi-row detector cannot be extracted from said first axial scan data, collecting second axial scan data while rotating at least one of said X-ray tube and multi-row detector relative to and around the subject to be imaged at a second position to which said X-ray tube and multi-row detector are rectilinearly moved relative to the subject to be imaged from said first position toward the end of said multi-row detector; a second projection data extracting device for extracting from said second axial scan data the projection data that could not be extracted from said first axial scan data of the reconstruction field near the end of said multi-row detector; and a CT image producing device for producing one CT image based on said extracted projection data of the reconstruction fields.

10. The X-ray CT apparatus of claim 9, wherein said second position is a position distant from said first position by a cone beam width at a center of rotation.

11. The X-ray CT apparatus of claim 9, wherein said CT image producing device determines combined projection data by applying weighted addition to said extracted projection data across the reconstruction fields, and produces one CT image from said combined projection data.

12. The X-ray CT apparatus of claim 11, wherein a weight for the weighted addition on said projection data is determined from a mutual relationship between the reconstruction fields, and from a predetermined weighting function.

13. The X-ray CT apparatus of claim 9, wherein said CT image producing device produces respective CT images from said extracted projection data of the reconstruction fields, and applies weighted addition to said CT images to produce one CT image.

14. The X-ray CT apparatus of claim 13, wherein a weight for the weighted addition on said CT images is determined from a mutual relationship between the reconstruction fields, and from a predetermined weighting function.

15. The X-ray CT apparatus of claim 11, wherein said first projection data extracting device extracts from said first axial scan data projection data corresponding to one line or a plurality of parallel lines at spacings of a plurality of pixels on each of said reconstruction planes; said second projection data extracting device extracts from said second axial scan data the projection data that could not be extracted from said first axial scan data of a reconstruction field near an end of said multi-row detector; and said CT image producing device generates projection line data by multiplying said projection data by a cone beam reconstruction weight, determines combined projection line data by applying weighted addition to said projection line data of corresponding lines across the reconstruction fields, generates image-positional line data by filtering said combined projection line data, determines backprojected pixel data of pixels on an image plane based on said image-positional line data, and determines backprojected data by adding the backprojected pixel data on a pixel-by-pixel basis across all views used in image reconstruction.

16. The X-ray CT apparatus of claim 13, wherein said first projection data extracting device extracts from said first axial scan data projection data corresponding to one line or a plurality of parallel lines at spacings of a plurality of pixels on each of said reconstruction planes; said second projection data extracting device extracts from said second axial scan data the projection data that could not be extracted from said first axial scan data of a reconstruction field near an end of said multi-row detector; said CT image producing device generates projection line data by multiplying said projection data by a cone beam reconstruction weight, generates image-positional line data by filtering said projection line data, determines backprojected pixel data of pixels on an image plane based on said image-positional line data, determines backprojected data by adding the backprojected pixel data on a pixel-by-pixel basis across all views used in image reconstruction, applies weighted addition on the corresponding backprojected data across said reconstruction fields, and produces one CT image.

* * * * *